United States Patent

[11] 3,610,938

| [72] | Inventors | Michael Anthony Cook;<br>John James Laurence Weaver; Arnaud<br>Michael Eccles, all of Stafford, England |
|---|---|---|
| [21] | Appl. No. | 864,378 |
| [22] | Filed | Oct. 7, 1969 |
| [45] | Patented | Oct. 5, 1971 |
| [73] | Assignee | The English Electric Company Limited<br>London, England |

[54] APPARATUS FOR MONITORING OPERATIONAL PARAMETERS OF HIGH-VOLTAGE VALVES
9 Claims, 4 Drawing Figs.

[52] U.S. Cl. .................................................. 250/214 R,
250/217 SS, 307/308, 250/227
[51] Int. Cl. ...................................................... H01j 39/12
[50] Field of Search ......................................... 307/308–311;
250/206, 214, 209, 211 J, 217 SS

[56] References Cited
UNITED STATES PATENTS
2,980,808  4/1961  Steele ........................... 307/308 X
3,192,471  6/1965  Kuhrt et al. ..................... 307/308 X
3,359,483  12/1967  Biard ............................. 307/311 X
3,524,986  8/1970  Harnden ......................... 250/211
3,487,221  12/1969  Frank ............................. 307/311 X

*Primary Examiner*—Walter Stolwein
*Attorneys*—Misegades and Douglas, Keith Misegades and George R. Douglas, Jr.

ABSTRACT: This invention relates to apparatus for monitoring various parameters of thyristor valves, e.g. voltage, current and temperature.

In particular a sensing circuit is associated with a said thyristor and is operable to develop a signal proportional to the monitored quantity, and a light emitter is energized by this signal and transmits a light signal proportional thereto along an optical path to a detector, the detector determining the monitored quantity from the received signal.

The invention is of particular utility in high-voltage DC transmission schemes.

APPARATUS FOR MONITORING OPERATIONAL PARAMETERS OF HIGH-VOLTAGE VALVES

This invention relates to apparatus for monitoring operational parameters of high-voltage valves, and more particularly relates to monitoring the parameters e.g. voltage, current, temperature etc. of thyristor valves in converters associated with high-voltage DC transmission schemes.

From one aspect, the present invention consists in apparatus for monitoring operational parameters of a high-voltage valve having a plurality of series and/or parallel connected thyristors, comprising a sensing circuit associated with a said thyristor and operable to develop a signal proportional to the monitored quantity, and a light emitter energized by the signal and operable to transmit a light signal proportional thereto along an optical path to a detector for determining the said monitored quantity from this signal.

The light emitter may be a gallium arsenide diode and the optical path may be defined by filamentary light guides (fiber optics) but other means may equally well be employed, e.g. Perspex rods, etc. Further, the term light is not to be interpreted as being visible light only, since radiation in the infrared or ultraviolet spectrums may also be utilized.

The quantity monitored may be the AC voltage across the thyristor, a proportion of this voltage being tapped off to modulate a DC bias current through the emitter diode, the modulated light signal being converted back into an electrical signal by a photodiode at the detector and processed accordingly before being presented on a display unit. In turn, the current may be monitored by disposing a Hall plate energized by current from an auxiliary source in a magnetic field the magnitude of which varies in dependence on the current through the thyristor, the resulting Hall voltage being applied to the emitter diode and the light signals being processed at the detector so as to present the relevant current value. A calibration pulse of known amplitude may periodically be transmitted via the emitter diode over the same transmission path as the "voltage" or "current" signal so as to provide a comparison level at the detector from which accurate measurements may be made of the actual voltage or current obtaining at the thyristor. Alternatively, the quantity monitored may be temperature, a thermistor being mounted on the thyristor or any other convenient heat source for this purpose. In this instance, the thermistor may be connected in one of the RC coupling circuits of a freely running multivibrator so that its resistance, which varies with temperature, affects the delay period during one of its two states. The mark-space ratio of the multivibrator thus varies and from the frequency of the pulses produced the temperature may be readily deduced at the detector.

This invention is of particular utility in high-voltage valves containing a stack of thyristors, the amplitude and wave shapes of the chosen quantity being readily determined despite the fact that the appropriate points within the valve are inaccessible. Where several groups of thyristors are employed in series or parallel with one another in such a stack only one thyristor in each group may be monitored in the manner described, and a switched scheme may be utilized whereby only one display unit need be provided for all the monitored thyristors.

In order that the invention may be fully understood, some embodiments thereof will now be described with reference to the accompanying drawing, in which.

Figure 1:
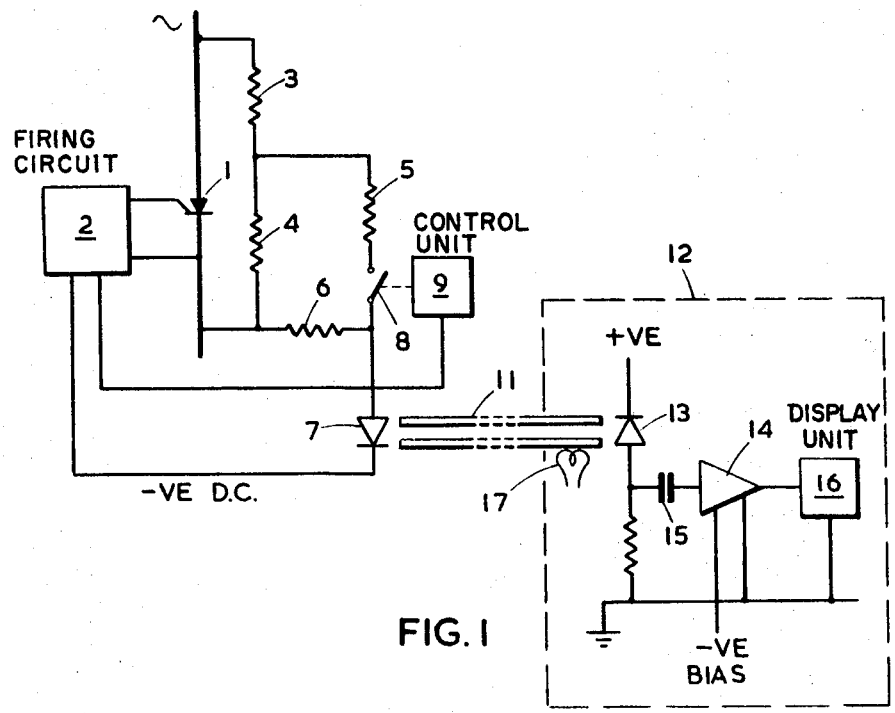
FIG. 1 shows apparatus for monitoring the AC voltage across a thyristor in a high-voltage valve.

Referring now to FIG. 1, a thyristor 1, which is a selected one of many connected in series and/or parallel in a high-voltage valve, is connected to an AC supply and fired in response to control signals from its firing circuit 2. The thyristor is bridged by two series resistors 3,4, the latter resistor itself being bridged by two further resistors 5,6. A gallium arsenide light-emitting diode 7 is connected to the junction between these further resistors, its cathode electrode being connected to a −VE DC bias voltage derived from a constant current source (not shown), and an electronic switch 8, e.g. a semiconductor switch, is connected between this junction and the resistor 5, the switch being operable by a control unit 9 synchronized to the firing circuit 2 for calibration purposes.

Filamentary light guides 11 extend between the emitter diode 7 and a silicon photodiode 13 in a detector 12 at or around ground potential, the output from this diode being AC coupled to an operational amplifier 14 through a capacitor 15 and applied to a display unit 16 for providing an indication of the voltage across the thyristor. A filament lamp 17 is provided adjacent the photodiode for providing an "optical bias" so as to reduce the ratio between its inherent dark current and noise current to the "light" current from the emitter diode.

In operation, with, say, a series string of 1.2 kv. thyristors the maximum amount of current which may be shunted off for measuring purposes without causing undue electrical unbalance is about 1 ma., but this is insufficient for operating the gallium arsenide diode 7 over the linear portion of its characteristic. Accordingly the negative DC bias (about 50 v. with respect to the thyristor cathode) is provided to the cathode of this diode to overcome this, the resulting current through the diode via the resistor 6 now being sufficient to ensure linear operation. In addition, since the diode only emits light in proportion to the magnitude of its forward current, this bias supply ensures that the diode is forward biassed during both the positive and negative excursions of the AC supply. In particular, the potential divider formed by the two resistors 3,4 ensures that the peak AC voltage at their junction does not fall beyond this −50 v. level, this voltage being applied to the diode 7 through resistor 5 so as to modulate its standing DC bias current.

The light emitted from the diode thus varies in intensity in dependence on the AC waveform and is transmitted through the light guides 11 to the photodiode 13, the AC waveform being applied to the display unit 16 where it is presented on an oscilloscope for observation and measurement.

As mentioned above, the switch 8 is provided for calibration. In particular, in order to take account of uncontrollable and indeterminate variations in the response of the emitter and photodiode and the attenuation of the light along its transmission path a calibrating signal of known amplitude is periodically transmitted along this path, e.g. during alternate cycles of the AC supply. This is effected by momentarily opening the switch 8 since, as a result, while the switch is open, the AC modulating signal is removed from the emitter diode and the DC bias current is reduced by a predetermined amount—since the bias current normally flows not only through resistor 6 but also through the series-connected resistors 4,5 which bridge this resistor. A sharp pulse therefore appears on the oscilloscope in the display unit the amplitude of which is equivalent to the known amount by which the current has been reduced. Thus, the peak-to-peak current of the AC waveform displayed following closure of the switch can readily be determined by direct comparison with the current pulse and from this the peak-to-peak voltage across the thyristor can be calculated.

By synchronizing the operation of the switch 8 to the thyristor-firing pulse there are no additional interference pulses created by this step and the time at which this calibration pulse occurs may readily be chosen for it to appear only when the anode-cathode voltage across the thyristor is in a positive direction supporting conduction.

Some degree of compensation for changes, with temperature, in the light emission versus forward current characteristic of the diode 7 may be obtained by replacing the resistor 5, and possible resistor 3, by a thermistor network so as to maintain a constant output over the expected excursions of the ambient temperature.

Figure 2:
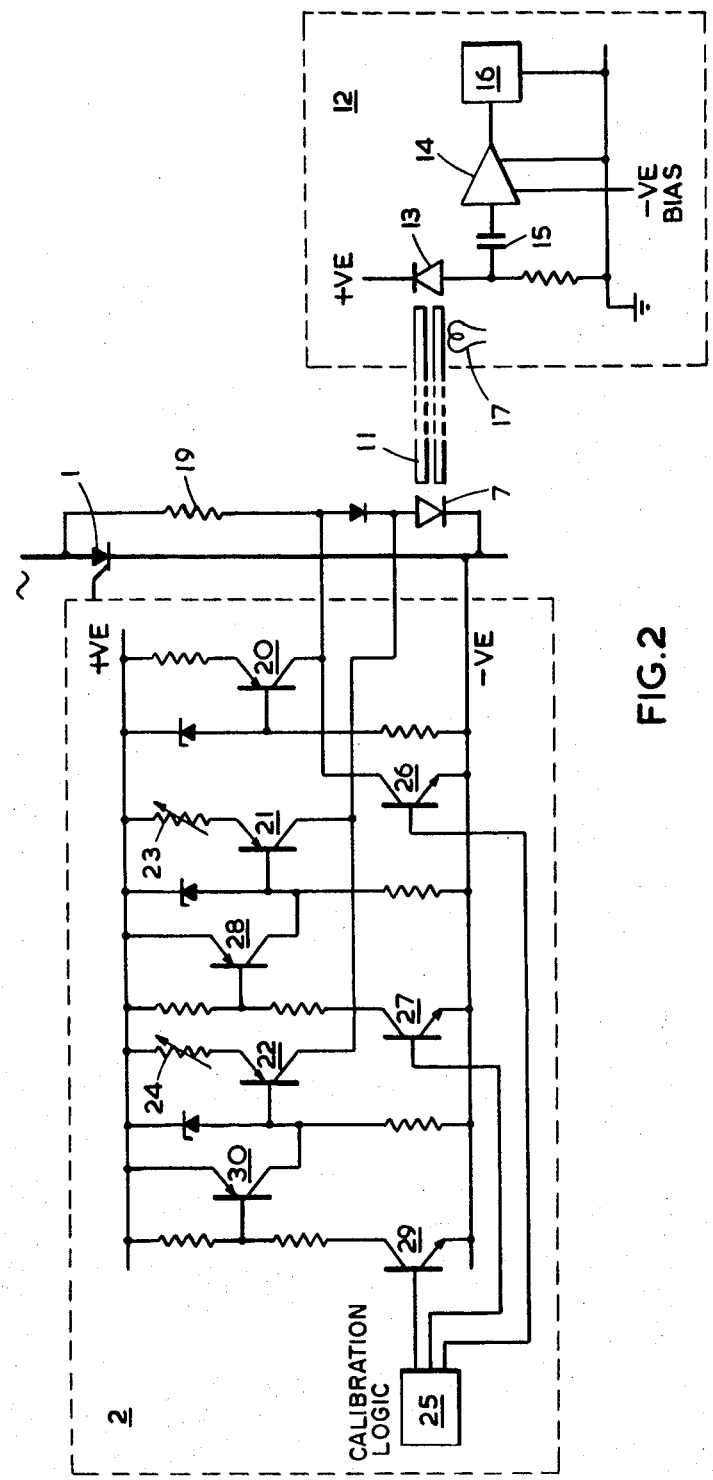
FIG. 2 shows an alternative to the FIG. 1 apparatus, in more detail.

Referring now to FIG. 2, an alternative voltage monitoring circuit is provided which embodies improved calibration techniques. This circuit is shown in more detail than FIG. 1 but like components to those shown in that Figure have been accorded the same reference numerals.

In particular, the constant current supply is provided, as before, but only a single resistor 19 is connected in series with the light-emitting diode 7 for monitoring the voltage across the thyristor 1. The constant current bias is supplied in the conventional manner via a transistor 20, and zero and positive/negative calibration levels are provided via transistors 21, 22, respectively, at values adjustable by the variable resistors 23, 24 in their emitter circuits. A calibration logic circuit 25 is provided for introducing the calibrating signals at the correct instants during the AC supply cycles.

In operation, during the calibration procedure transistor 26 is turned on in order to inhibit or remove the AC waveforms and during this period the zero level and the calibration level are introduced at successive instants. Transistor 27 is turned off, causing its associated transistor 28 to turn off, to determine the zero level via the transistor 21, and similarly transistor 29 is turned off, causing its associated transistor 30 to turn off, to determine the calibration level—positive or negative as desired, via the transistor 22.

Figure 3:
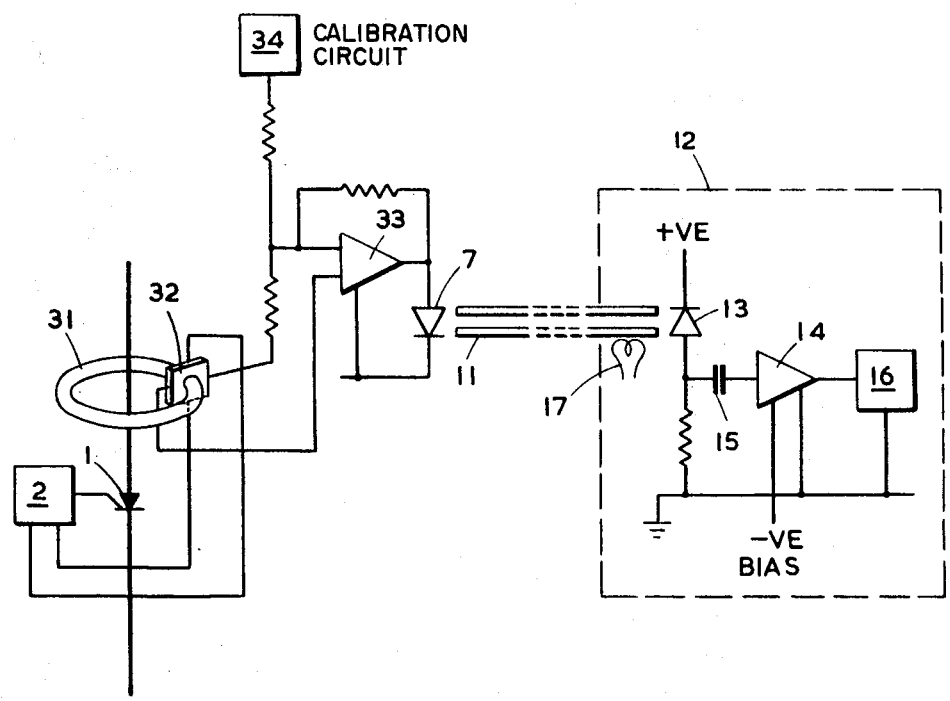
FIG. 3 shows apparatus for monitoring the current through the thyristor.

Referring now to FIG. 3, there is shown apparatus for monitoring the current instead of the voltage.

In this instance, the main conductor is embraced by a ferrite toroid 31 having an airgap into which a Hall plate 32 is cemented. The Hall plate is energized by current from the firing circuit 2 and lies perpendicularly to the direction of the magnetic flux lines around the toroid. This flux φ is proportional to the current I passing through the main conductor; accordingly, the resulting Hall voltage, which is applied to an operational amplifier 33, is representative of this current value, this voltage V being given by $$V = S \cdot I \cdot \phi$$

where $S$ is a sensitivity factor dependent primarily on the thickness and conductivity of the semiconductor plate.

In turn, the output from the amplifier is applied to the emitter diode 7, the optical information transmitted being determined and processed in the detector 12 as before so as to provide the information on the thyristor current.

Just as with the case in respect of voltage monitoring, a calibration pulse is periodically transmitted with the current signal in order for the value of the latter to be accurately determined, this current pulse being derived from the magnetic field set up around the main conductor and applied to the amplifier 33 from the "calibration" circuit schematically illustrated at 34.

Figure 4:
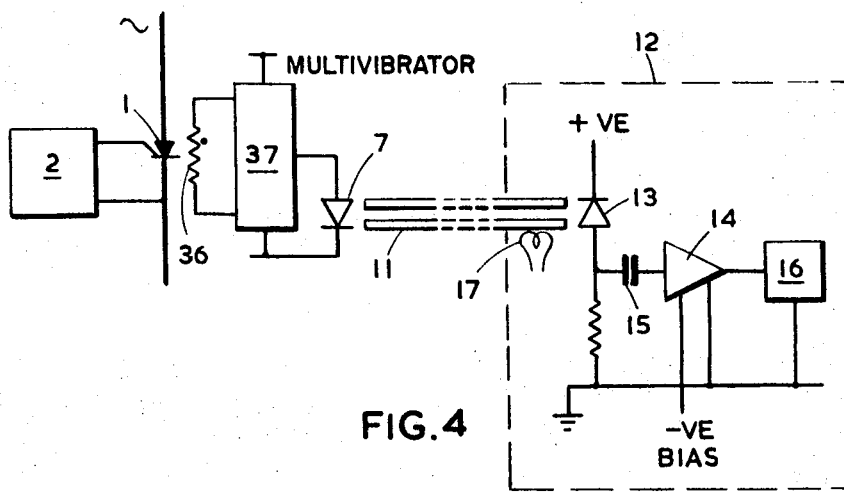
FIG. 4 shows apparatus for monitoring the temperature of the thyristor.

The temperature of the thyristor itself may be monitored by the apparatus in FIG. 4, and again like components to those shown in FIG. 1 have been accorded the same reference numerals. Referring now to FIG. 4 a thermistor 36 is mounted on the base plate of the thyristor 1 and is connected in one of the RC coupling arms in a freely running astable multivibrator 37. Accordingly, as the resistance of the thermistor varies with temperature a corresponding change is effected in the delay period during one state of the multivibrator so that its mark-space ratio, and its duty cycle, varies.

The pulsed output from the multivibrator energizes the gallium arsenide diode 7 and a pulsating light signal is transmitted through the guides 11 to the detector 12 at ground level. This detector is substantially the same as that described in relation to FIG. 1, but in this instance the display unit 16 incorporates a frequency detector for measuring the frequency of the input pulses from which the temperature of the thyristor can be determined. Alternatively, the temperature can be determined by measuring on an oscilloscope the effective delay period in the multivibrator and calculating from this the resistance of the thermistor, from which the temperature can be derived.

It is to be understood that many modifications may readily be made to the apparatus described above without departing from the scope of this invention. For example, for current monitoring an ordinary ferrite current transformer may be employed to sample the thyristor current instead of the Hall device, or even an air-cored current transformer with a secondary integrating circuit. Furthermore, provision may also be made for employing the same fiber optics for both the transmission of the telemetry signals as described and the transmission of the control pulses from ground level for firing the thyristors; this could conveniently be effected, for example, by employing different time intervals for the two-way transmission of this information.

We claim:

1. Apparatus for monitoring an operational parameter of a thyristor in a high-voltage circuit including
    a sensing circuit associated with said thyristor to develop an electrical signal representing said parameter,
    a first light emitter energized by said electrical signal and operative to develop a corresponding light signal,
    a detector,
    an optical path between said first light emitter and the detector and along which the light signal is transmitted, the detector being responsive to the light signal to determine the magnitude of the monitored parameter, and
    a second light emitter to apply an optical bias to the detector.

2. Apparatus according to claim 11, wherein the optical path is defined by fiber optic guides.

3. Apparatus according to claim 2, wherein the parameter monitored is an AC voltage across the thyristor, the sensing circuit including
    a power source connected to the first light emitter for passing a constant current bias therethrough, and
    circuit means for tapping off from said thyristor a proportion of the AC voltage and modulating the bias current therewith.

4. Apparatus according to claim 2, wherein the parameter monitored is the thyristor current, the sensing circuit including
    a Hall plate connected to the first light emitter,
    magnetic means for disposing the plate in a magnetic field the magnitude of which varies in dependence on the thyristor current, and
    a power source for energizing the plate with a current signal, the resulting Hall voltage being applied to the first light emitter.

5. Apparatus according to claim 4, wherein the magnetic means comprises
    a ferrite toroid embracing a conductor to the thyristor.

6. Apparatus according to claim 2, wherein the parameter monitored is the thyristor temperature, the sensing circuit including
    a thermistor mounted adjacent the thyristor and
    an auxiliary circuit connected to and responsive to the said thermistor, the output from the auxiliary circuit being applied to the first light emitter.

7. Apparatus according to claim 6, wherein the auxiliary circuit comprises
    an astable multivibrator, the mark-space ratio of the multivibrator varying in dependence on the temperature monitored.

8. Apparatus for monitoring an operational parameter of a thyristor in a high-voltage circuit including
    a sensing circuit associated with said thyristor to develop an electrical signal representing said parameter,
    a first light emitter energized by said electrical signal and operative to develop a corresponding light signal,
    a detector,
    an optical path between said first light emitter and the detector and along which the light signal is transmitted, the detector being responsive to the light signal to determine the magnitude of the monitored parameter, and
    a calibration circuit for periodically transmitting both a zero level and a calibration optical pulse of known amplitude to the detector over said optical path to provide a comparison level of the actual monitored parameter obtaining at the thyristor.

9. Apparatus according to claim 8, including a second light emitter to apply an optical apply an optical bias to the detector.